United States Patent [19]

Meynard

[11] 3,890,263

[45] June 17, 1975

[54] METHOD OF PRODUCING A THERMOPLASTIC COMPOSITION COMPRISING ESSENTIALLY BITUMEN AND AN ELASTOMER, AND PRODUCT THUS OBTAINED

[75] Inventor: Jean-Yves Meynard, Cormenon, France

[73] Assignee: Societe Nouvelle Siplast, Paris, France

[22] Filed: May 8, 1974

[21] Appl. No.: 468,262

[30] Foreign Application Priority Data
May 11, 1973  France .............................. 73.17159

[52] U.S. Cl. ..................... 260/28.5 AS; 260/42.43
[51] Int. Cl.² ....................................... C08L 95/00
[58] Field of Search ............................ 260/28.5 AS

[56] References Cited
UNITED STATES PATENTS
3,154,508  10/1964  Clelland ..................... 260/28.5 AS
3,790,519  2/1974  Wahlborg .................... 260/28.5 AS FOREIGN PATENTS OR APPLICATIONS
1,304,238  1/1973  United Kingdom .......... 260/28.5 AS
47-46766  11/1972  Japan ........................... 260/28.5 AS Primary Examiner—Melvyn I. Marquis

[57] ABSTRACT

This invention provides a method of producing an improved thermoplastic composition comprising essentially a bitumen of petroleum origin and an elastomer. Possibly, a mineral filler is used, and a dissolving intermediary is used. The basic principle of the method is derived from the fact that high-ethylene EPR elastomers can easily be dispersed in a bitumen medium, provided that these elastomers are mixed up beforehand with a solid dissolving intermediary capable of reducing their cohesion, said dissolving intermediary consisting of one or a plurality of saturated or unsaturated polyolefins.

31 Claims, No Drawings

METHOD OF PRODUCING A THERMOPLASTIC COMPOSITION COMPRISING ESSENTIALLY BITUMEN AND AN ELASTOMER, AND PRODUCT THUS OBTAINED

BACKGROUND OF THE INVENTION

Many known patents disclose a wide range of compositions utilizing the combination of bitumen with high polymers, the chief advantage of these compositions residing in a lower thermal susceptibility, generally a greater elastic elongation and in certain cases an improved ultimate strength.

As a rule, these various mixtures are obtained by mixing up the polymers in a molten bitumen medium so that they become dispersed therein.

Unfortunately, it happens that these polymers, though extremely easy to incorporate, produce mixtures having mostly scarcely advantageous properties. Thus, in fact, to facilitate their dispersion, these polymers must have a low viscosity at the mixing temperature, which is of the order of 200°C. This is obtained with polymers having a very moderately branched chain (and, therefore, the mechanical properties of the mixture are characterized by a certain anisotropy) and/or with polymers having a low molecular mass (and in this case the mixtures have only poor mechanical properties).

On the other hand, when it is desired to mix polymers having a high molecular mass and a certain branching rate (i.e. a high viscosity) with bitumens, extremely powerful mixing equipments, for example of the internal mixer type, must be used, and this of course is extremely costly.

The Applicants acknowledged the advantageous properties of hitherto inutilized mixtures of bitumen and elastomer of the EPR (ethylene propylene rubber) polymer type including the EPT (ethylene propylene terpolymer) or EPDM (ethylene propylene diene monomer) type incorporating a high ethylene content, for example in excess of 53% by weight. In fact, in comparison with pure bitumen, these bitumen/EPR mixtures have a higher tensile strength, a greater ultimate elongation, and are less fragile at low temperature, than a direct-distillation or oxidized bitumen of same viscosity at 25°C. In comparison with a known bitumenelastomer composition (natural rubber or styrene-butadiene copolymer, or isoprene copolymer), the benefit is found in an improved aging resistance. In comparison with a known bitumen and EPR copolymer composition having an ethylene content not in excess of 53% by weight, i.e. a low crystallinity rate and a low mechanical strength in the crude state, the advantage resides in the mechanical strength improved through the use of an EPR having a higher crystallinity rate and a higher mechanical strength in the crude state, due to the ethylene content in excess of 53% by weight.

Unfortunately, these mixtures are obtained at the expenses of a complicated mechanical treatment involving the use of a mixer of the type used in the rubber industry, or through conventional bitumen processing methods, after a relatively long time and at a relatively high temperature (for example 2 to 3 hours at about 300°C), thus impairing the polymer very considerably.

SUMMARY OF THE INVENTION

The present invention resulted from the observation of the fact that while high-ethylene EPR-type elastomers do not disperse easily and satisfactorily in the bitumen through the direct method, such dispersion can take place very easily if said polymers are mixed up beforehand with a solid dissolving intermediary capable of reducing their cohesion and consisting of one or more saturated or unsaturated polyolefins.

It was already known to use with low-ethylene EPR a liquid dissolving intermediary which was subsequently removed (cf. French Pat. No. 1,368,242). The bitumens thus obtained were soft products usable only for making road carpets. With the high-ethylene EPR used according to the present invention a solid dissolving intermediary is required, which remains in the end product or composition. The end product has such properties that it can be used as a sealing compound. Thus, the improved bituminous product according to this invention, which has a greater cohesion and a higher mechanical strength that hitherto known bitumen/EPR mixtures, can be used after melting at a temperature of about 200°C in the manufacture by impregnation, casting, coating, etc. of water-tight sheets and joints. This product is also suitable for making road carpets and like applications, and may also be used as a rubber substitute in certain specific applications.

It is therefore the primary object of the present invention to provide a method of manufacturing a thermoplastic composition comprising a bitumen and an elastomer, by using a dissolving intermediary, this method being characterized in that the elastomer consists of a random ethylene-propylene copolymer, referred to as EPR, including the ethylene-propylene-diene random terpolymer referred to as EPDM, said EPR copolymer consisting of 54 to 77% by weight of ethylene, 0 to 5% by weight of diene and the balance to 100% by weight of propylene, in that a solid dissolving intermediary is used which consists of at least one saturated or unsaturated, linear or branched polyolefin having a mean molecular weight ranging from about 2,000 to about 500,000, in that said elastomer is mixed up in the hot state with said dissolving intermediary, and that the mixture thus obtained in granulated to a particle size of about 2 to 3 mm in order to produce a preliminary granulated mixture of said elastomer and dissolving intermediary, then in that said granulated pre-mixture is kneaded with bitumen and possibly a mineral filler at a temperature within the range of 180° to 250°C, to yield a dispersion in the form of fine particles of said granulated pre-mixture through the bitumen mass, said bitumen being of petroleum origin and having a penetration of 1 to 500 at 25°C according to the French Standard NF T 66 004.

Said EPR copolymer, notoriously of the high-cohesion and high mechanical strength type in the crude state, contains preferably 65 to 77% by weight of ethylene and consists notably of said EPDM having a maximum diene content of 5% by weight. The presence of diene is immaterial for the scope of the present invention. In fact, diene is a vulcanizing or curing agent, but according to this invention the terpolymer is used in the crude, non-vulcanized state. What matters is only the high ethylene proportion in the elastomer; the EPDM's are cited herein and used in the following Examples only because, so far as the Applicants are aware, these products are the only commercially available EPR containing the requisite proportion by weight of ethylene, i.e. higher than 53%. For the EPDM utilized according to the present invention the lower limit of the diene content is not mentioned for it is immaterial and may be as close to zero as desired. As to the upper limit of said diene proportion, it is mentioned as corresponding to 5% simply because this is the highest content found in commercially available EDPM for the time being; however, this 5% value may be overstepped without any inconvenience for the EPDM application contemplated herein, the only imperative requirement to be met being the ethylene content.

This invention is also concerned with the thermoplastic composition obtained by carrying out the above-defined method.

Considered more in detail, the manufacturing process is conducted as follows:

Firstly, the EPR is mixed up with the polyolefin by applying the conventional means used in the rubber industry (open mixer or internal mixer), the mixture temperature being preferably at least equal to the softening temperature of the dissolving intermediary which may range for instance from 70° to 150°C in the case of polyethylenes, the softening point increasing with the molecular weight, and from 150° to 160° in the case of polypropylenes, this temperature depending on the softening temperature of the polyolefin and also on the type of mixing apparatus used; thus, the mix is heated during the mixing operation, if necessary; then the mixture is granulated to particles within the range of about 2 to 3 mm in a conventional granulator. To mix up the two substances, an extruder may be used, possibly while heating them, the granulation being obtained in this case by cutting the wires issuing from the extruder nozzle. Then the granulated material is mixed up with bitumen and possibly with a mineral filler at a temperature within the range of 180° to 250°C in a conventional-type bitumen mixer, for example a road work site mixer or other-suitable apparatus. Thus, the granulated material is dispersed in the form of fine particles throughout the mass of bitumen.

The term "EPDM elastomer" (also called simply "EPT") designates elastomers known per se, of the random ethylenepropylene-diene terpolymer type comprising a main saturated chain and unsaturated lateral chains from the diene.

The dienic monomer may consist of:

a preferably non-conjugated aliphatic diene, such as hexadiene-(1.4) (for instance in certain EPDM known under the Trademark NORDEL produced by Dupon de Nemours in the U.S.A.), an endomethylene compound such as dicyclopentadiene (for instance in certain ROYALENE EPDM produced by Uniroyal, Inc., U.S.A.), 5-methylene-norbornene-(2) (such as in the VISTALON EPDM produced by Enjay Chemical, U.S.A.), 5ethylidene-norbornene-(2) (for instance in certain KELTAN EPDM produced by D.S.M. in Holland), a cyclic polyene, such as 1-methyl-cyclooctadiene.

As mentioned hereinabove, the diene content may vary from 0 to 5% by weight and the ethylene content from 54 to 77% by weight, the balance to 100% being propylene. The preferred ethylene content is from 65 to 77% by weight, thus yielding an EPDM having a high mechanical strength in the crude state (i.e. in the non-vulcanized state) and reducing accordingly the amount of elastomer to be added to the bitumen, given an equal mechanical strength of the mixture.

The above-given EPDM denominations are registered Trademarks.

The term "polyolefin" designates any polyolefins of the saturated type, of variable molecular size, and containing or not side chains. The mean molecular weight of these polyolefins may vary between 2,000 and 500,000. These polyolefins may also be unsaturated, but the unsaturated property of the molecule has no influence whatsoever on the phenomenon.

The bitumen to be used are of petroleum origin and obtained by direct distillation or blowing.

The typical composition of a pre-mixture granulated compound is given hereinafter by way of example:

99 to 50% of EPR selected from the group consisting of EPR's having a high mechanical strength in the crude state, containing 65 to 77% by weight of ethylene and having a Mooney (1+4) viscosity at 121°C within the range of 20 to 100, and preferably of 60 to 70; said viscosity is measured with the Mooney apparatus after a one-minute pre-heating and a 4 minute rotor operation at 121°C.

1 to 50% of dissolving intermediary consisting of at least one polyolefin selected preferably from the group consisting of:

a. A polyethylene having a density $d$ at 20°C within the range of 0.912 g/c.c. to 0.965 g/c.c., preferably 0.920 g/c.c. to 0.925 g/c.c., and of which the hot coefficient of fluidity G measured according to the French standard NET 51016 ranges from 0.3 g/10 mn to 200 g/10 mn, and preferably from 0.7 g/10 mn to 2 g/10 mn.

b. An isotactic polypropylene having a density of 0.9 g/c.c at 20°C and a hot coefficient of fluidity measured according to the French standard NFT 51016 within the range of 1 g/10 mn to 6 g/10 mn.

c. An atactic polypropylene having a ball-ring softening temperature measured according to the French standard NFT 66 008 within the range of 150°C to 160°C (this softening temperature being designated hereinafter by the abbreviation "Tba"); the penetration of this propylene, calculated at 25°C with 100 g of load during 5 seconds, according to the French standard NFT 66 004, is 15–20, this penetration designated hereinafter by the abbreviation "Pen 25°C" corresponding to tenths of millimeter.

The bitumen mixture has preferably the following compopsition (by weight):

1 to 15% of the above-described granulated substance, 99 to 35% of a bitumen having a penetration Pen 25°C within the range of 1 to 500, and 0 to 50% of a mineral filler (for example chalk or kaolin), provided that the total equals 100%.

DESCRIPTION OF THE PREFERRED EMBODIMENTS

In the following examples illustrating the preparation and composition of thermoplastic compositions according to this invention the percentages are by weight. The EPDM used therein is anyone of the products designated by the above-mentioned Trademarks, having a high mechanical strength in the crude state, containing 65 to 77% by weight of ethylene, for instance 73%, 0 to 5% by weight of diene, for example 3%, the balance to 100% by weight being propylene, and having the indicated Mooney viscosity [ML (1+4)] of 60 at 121°C. The EPDM preferably used contains as a diene hexadiene-(1.4).

EXAMPLE 1

Temperature for mixing the pre-mixture granular substance with the bitumen: 200°C Dispersion time: 35 to 45 mn.

Granulated material
{
  EPDM-ML(1+4) 121°C=60   8%

Polyethylene-$d_{20°C}$ =0.922 g/c.c.
  -hot fluidity number
  =0.7 g/10 mn   2%
}

Bitumen Pen 25°C 180/220   90%
Mixing temperature EPDM + polyethylene: 150°C
Properties of final mixture thus obtained:
  R (1) = 4 to 6 kg per sq.cm.
  A (2) = 800%
  Tba (3) = 100°C
  Pen 25°C (4) = 45

Wherein:
1. = Ultimate tensile strength measured with a 120×2.5×20 mm sample, distance between jaws = 40mm, traction rate 50 mm/mn, temperature 22°C, relative humidity 65%.
2. = Elongation measured at breaking point of sample.
3. = Ball-ring softening temperature according to French standard NF T 66 008.
4. = Penetration at 25°C.

EXAMPLE 2

Mixing temperature of granulated pre-mixture with bitumen = 200°C.

Dispersion time = 40 mn.

Granulated material
{
  EPDM — ML (1+4)
  121°C=60   7%

Atactic polypropylene, mean
  molecular weight = 2500   3%
}

Bitumen, Pen 25°C 5/15   90%
Mixing temperature of EPDM with polypropylene = 150°C
Properties of final mixture thus obtained:
  R    = 4 to 6 kg per sq. cm.
  A    = 500%
  Tba  = 155°C
  Pen 25°C = 10.

EXAMPLE 3

Mixing temperature of granulated pre-mixture with bitumen = 200°C

Dispersion time = 50 mn.

Granulated material
{
  EPDM — ML (1+4) 121°C = 60   6%

Isotactic polypropylene - $d_{20°C}$=0.9 g per cu.cm.
  coefficient of fluifity in the hot state =
  3 g per 10mn   4%
}

Bitumen, Pen 25°C 80/100   90%

Mixing temperature of EPDM with polypropylene: 160°C

Properties of final mixture thus obtained:
  R    = 4 kg per sq. cm.
  A    = 700%
  Tba  = 95°C
  Pen 25°C = 30.

What is claimed is:

1. A method of producing a thermoplastic composition comprising bitumen, an elastomer and possibly a mineral filler, by using a dissolving intermediary, wherein there is used as an elastomer a random ethylene-propylene copolymer referred to as EPR including the random ethylene-propylene-diene terpolymer referred to as EPDM of which the diene component is selected from the group consisting of hexadiene-(1.4), dicyclopentadiene, 5-methylene-norbornene-(2), 5-ethylene-norbornene-(2) and 1-methyl-cyclooctadiene, said EPR copolymer consisting of 54 to 77% by weight of ethylene, 0 to 5% by weight of diene and the balance to 100% by weight of propylene, a solid dissolving intermediary is used which consists of at least one polyolefin, saturated or unsaturated, linear or branched, having a mean molecular weight within the range of 2,000 to 500,000 and selected from the group consisting of polyethylene, isotactic polypropylene and atactic polypropylene, said elastomer is mixed up with said dissolving intermediary in the proportions of 99 to 50% by weight of said elastomer and 1 to 50% by weight of said dissolving intermediary, at a temperature at least equal to the softening temperature of said dissolving intermediary, which ranges from 70° to 150°C in the case of polyethylenes and from 150° to 160°C for polypropylenes, the mixture is subsequently granulated to a particle size of about 2 to 3 mm., to yield a granulated elastomer and dissolving intermediary pre-mixture, whereafter said granulated pre-mixture is kneaded with said bitumen and said possible mineral filler, in the proportions of 1 to 15% by weight of said pre-mixture granular substance, 99 to 35% by weight of said bitumen and 0 to 50% by weight of said mineral filler, provided that the total of these three component elements is 100% by weight, at a temperature within the range of 180° to 250°C, in order to obtain a fine particulate dispersion of said granulated pre-mixture in the bitume n mass, said bitumen being of petroleum origin and having a penetration at 25°C of 1 to 500 according to the French standard NF T 66 004.

2. A method as set forth in claim 1, wherein said used elastomer consists of an EPR copolymer containing 65 to 77% by weight of ethylene.

3. A method as set forth in claim 2, wherein a mixture of 90% by weight of said bitumen and 10% by weight of said premixture granulated substance are kneaded at a temperature of 200°C, said elastomer being an EPDM terpolymer having a Mooney viscosity equal to 60 and consisting of 65 to 77% by weight of ethylene, not more than 5% by weight of diene and the balance to 100% by weight of propylene.

4. A method as set forth in claim 3, wherein said EPDM terpolymer consists of 73% by weight of ethylene, 3% by weight of diene, and the balance to 100% by weight of propylene.

5. A method as set forth in claim 4, wherein said pre-mixture granulated substance comprises 2 parts by weight of polyethylene for every 8 parts by weight of said EPDM.

6. A method as set forth in claim 4, wherein said pre-mixture granulated substance comprises 3 parts by weight of atactic polypropylene for every 7 parts by weight of said EPDM.

7. A method as set forth in claim 4, wherein said premixture granulated substance comprises 4 parts by weight of isotactic polypropylene for every 6 parts by weight of said EPDM.

8. A method as set forth in claim 5, wherein the diene of said EPDM is hexadiene-(1.4).

9. A method as set forth in claim 6, wherein the diene of said EPDM is hexadiene-(1.4).

10. A method as set forth in claim 7, wherein the diene of said EPDM is hexadiene-(1.4).

11. A method as set forth in claim 5, wherein the diene of said EPDM is selected from the group consisting of dicyclopentadiene, 5-methylene-norbornene-(2), 5-ethylidene-norbornene-(2) and 1-methylcyclooctadiene.

12. A method as set forth in claim 6, wherein the diene of said EPDM is selected from the group consisting of dicyclopentadiene, 5-methylene-norbornene-(2), 5-ethylidene-norbornene-(2) and 1-methylcyclooctadiene.

13. A method as set forth in claim 7, wherein the diene of said EPDM is selected from the group consisting of dicyclopentadiene, 5-methylene-norbornene-(2), 5-ethylidene-norbornene-(2) and 1-methylcyclooctadiene.

14. A thermoplastic composition produced by applying the method set forth in claim 1, consisting of 99 to 35% by weight of bitumen of petroleum origin having a penetration of 1 to 500 at 25°C according to the French standard NF T 66 004; of 1 to 15% by weight of fine particles dispersed through the mass of said bitumen and consisting of a mixture of 99 to 50% by weight of a random ethylene-propylene copolymer referred to as EPR, including the random ethylene-propylene-diene terpolymer referred to as EPDM, wherein said diene component element is selected from the group consisting of hexadiene-(1.4), dicyclopentadiene, 5-methylene-norbornene-(2), 5-ethylidene-norbornene-(2) and 1-methyl-cyclooctadiene, said EPR copolymer having an ethylene content of 54 to 77% by weight, a diene content of 0 to 5% by weight, and a propylene content to make the balance to 100% by weight and a Mooney viscosity ML (1+4) at 121°C of 60 to 70, and 1to 50% by weight of at least one saturated or unsaturated polyolefin containing or not side chains and having a mean molecular weight within the range of 2,000 to 500,000, said polyolefin being selected from the group consisting of polyethylene, isotactic polypropylene and atactic polypropylene; and of 0 to 50% by weight of a mineral filler, provided that the total of the three component elements corresponds to 100% by weight.

15. A thermoplastic composition as set forth in claim 14, wherein said EPR copolymer has an ethylene content of 65 to 77% by weight.

16. A thermoplastic composition as set forth in claim 15, consisting of 90% by weight of said bitumen and 10% by weight of said fine particles, in which said EPR copolymer is an EPDM terpolymer having a Mooney viscosity of 60 and consisting of 65 to 77% by weight of ethylene, not more than 5% by weight of diene and the balance to 100% by weight of propylene.

17. A thermoplastic composition as set forth in claim 16, wherein said EPDM consists of 73% by weight of ethylene, 3% by weight of diene, and the balance to 100% by weight of propylene.

18. A thermoplastic composition as set forth in claim 17, wherein said particles consist of 2 parts by weight of polyethylene of coefficient of fluidity in the hot state 0.7 grams / 10 minutes for every 8 parts by weight of said EPDM.

19. A thermoplastic composition as set forth in claim 17, wherein said particles consist of 3 parts by weight of atactic polypropylene for every 7 parts by weight of said EPDM.

20. A thermoplastic composition as set forth in claim 17, wherein said particles consist of 4 parts by weight of isotactic polypropylene for every 6 parts by weight of said EPDM.

21. A thermoplastic composition as set forth in claim 18, wherein the diene of said EPDM is hexadiene-(1.4).

22. A thermoplastic composition as set forth in claim 19, wherein the diene of said EPDM is hexadiene-(1.4).

23. A thermoplastic composition as set forth in claim 20, wherein the diene of said EPDM is hexadiene-(1.4.).

24. A thermoplastic composition as set forth in claim 18, wherein the diene of said EPDM is selected from the group consisting of dicyclopentadiene, 5-methylene-norbornene-(2), 5-ethylidene-norbornene-(2) and 1-methyl-cyclooctadiene.

25. A thermoplastic composition as set forth in claim 19, wherein the diene of said EPDM is selected from the group consisting of dicyclopentadiene, 5-methylene-norbornene-(2), 5-ethylidene-norbornene-(2) and 1-methyl-cyclooctadiene.

26. A thermoplastic composition as set forth in claim 20, wherein the diene of said EPDM is selected from the group consisting of dicyclopentadiene, 5-methylene-norbornene-(2), 5-ethylidene-norbornene-(2) and 1-methyl-cyclooctadiene.

27. A method as set forth in claim 2, wherein said used EPR copolymer has a Mooney viscosity ML (1+4) at 121°C of 60 to 70.

28. A method as set forth in claim 1, wherein said used polyolefin is polyethylene having a coefficient of fluidity in the hot state of 0.7 grams/10 minutes to 2 grams/10 minutes.

29. A method as set forth in claim 27, wherein said used polyolefin is polyethylene having a coefficient of fluidity in the hot state of 0.7 grams/10 minutes to 2 grams/10 minutes.

30. A thermoplastic composition as set forth in claim 14, wherein said polyolefin is polyethylene having a coefficient of fluidity in the hot state of 0.7 grams/10 minutes to 2 grams/10 minutes.

31. A thermoplastic composition as set forth in claim 15, wherein said polyolefin is polyethylene having a coefficient of fluidity in the hot state of 0.7 grams/10 minutes to 2 grams/10 minutes.

* * * * *